(12) United States Patent
Savatsky et al.

(10) Patent No.: US 10,174,142 B2
(45) Date of Patent: Jan. 8, 2019

(54) METHODS OF CHANGING POLYOLEFIN PRODUCTION RATE WITH THE COMPOSITION OF THE INDUCED CONDENSING AGENTS

(71) Applicant: Univation Technologies, LLC, Houston, TX (US)

(72) Inventors: Bruce J. Savatsky, Kingwood, TX (US); Brandon C. Locklear, Houston, TX (US); R. Eric Pequeno, Baytown, TX (US); Abarajith S. Hari, Ridgecrest, CA (US); David M. Glowczwski, Baytown, TX (US)

(73) Assignee: Univation Technologies, LLC, Houston, TX (US)

( * ) Notice: Subject to any disclaimer, the term of this patent is extended or adjusted under 35 U.S.C. 154(b) by 14 days.

(21) Appl. No.: 15/527,997

(22) PCT Filed: Nov. 24, 2015

(86) PCT No.: PCT/US2015/062465
§ 371 (c)(1),
(2) Date: May 18, 2017

(87) PCT Pub. No.: WO2016/086006
PCT Pub. Date: Jun. 2, 2016

(65) Prior Publication Data
US 2017/0355791 A1 Dec. 14, 2017

Related U.S. Application Data

(60) Provisional application No. 62/084,271, filed on Nov. 25, 2014.

(51) Int. Cl.
*C08F 110/02* (2006.01)
*B01J 8/24* (2006.01)
(Continued)

(52) U.S. Cl.
CPC ............ *C08F 110/02* (2013.01); *B01J 8/003* (2013.01); *B01J 8/006* (2013.01); *B01J 8/0055* (2013.01);
(Continued)

(58) Field of Classification Search
CPC .................. B01J 8/1827; B01J 8/1809; B01J 2208/00628; C08F 2/34; C08F 110/02
(Continued)

(56) References Cited

U.S. PATENT DOCUMENTS 6,265,502 B1 7/2001 Herzog
6,391,986 B1 5/2002 Goode et al.
(Continued)

OTHER PUBLICATIONS

International Search Report and Written Opinion for related PCT Application PCT/US2015/062465, dated Mar. 7, 2016 (15 pgs).
(Continued)

*Primary Examiner* — Fred M Teskin
(74) *Attorney, Agent, or Firm* — Brooks, Cameron & Huebsch, PLLC

(57) ABSTRACT

Polyolefin polymerization performed by contacting in a reactor an olefin monomer and optionally a comonomer with a catalyst system in the presence of induced condensing agents (ICA) and optionally hydrogen. The ICA may include two or more ICA components where the composition of the ICA (i.e., the concentration of each ICA component) may affect the polyolefin production rate. Changes to the relative concentration of the two or more ICA components may be according to ICA equivalency factors that allow for increasing the polyolefin production rate while maintain a sticking temperature, increasing polyolefin production rate while increasing the dew point approach temperature of the ICA, or a combination thereof.

16 Claims, 5 Drawing Sheets

(51) Int. Cl.
*C08F 2/34* (2006.01)
*C08F 2/38* (2006.01)
*B01J 8/18* (2006.01)
*B01J 8/00* (2006.01)
*B01J 19/24* (2006.01)

(52) U.S. Cl.
CPC ........... *B01J 8/1809* (2013.01); *B01J 8/1827* (2013.01); *B01J 8/1836* (2013.01); *B01J 8/24* (2013.01); *C08F 2/34* (2013.01); *B01J 2208/00053* (2013.01); *B01J 2208/00061* (2013.01); *B01J 2208/00274* (2013.01); *B01J 2208/00557* (2013.01); *B01J 2208/00628* (2013.01); *B01J 2208/00637* (2013.01); *B01J 2208/00982* (2013.01); *B01J 2208/00991* (2013.01); *B01J 2219/002* (2013.01); *B01J 2219/00213* (2013.01); *B01J 2219/00238* (2013.01)

(58) Field of Classification Search
USPC .......................................................... 526/88
See application file for complete search history.

(56) References Cited

U.S. PATENT DOCUMENTS

| | | | |
|---|---|---|---|
| 2005/0182207 A1* | 8/2005 | Singh | ..................... C08F 10/02 526/68 |
| 2007/0060724 A1 | 3/2007 | Ker et al. | |
| 2007/0265400 A1 | 11/2007 | Fischbuch et al. | |
| 2014/0148563 A1 | 5/2014 | Banat et al. | |
| 2015/0209751 A1 | 7/2015 | Hari et al. | |
| 2015/0210782 A1 | 7/2015 | Hari et al. | |

OTHER PUBLICATIONS

Second Written Opinion for related PCT Application PCT/US2015/062465, dated Oct. 26, 2016 (10 pgs).

International Preliminary Report on Patentability for related PCT Application PCT/US2015/062465, dated Jan. 1, 2017 (18 pgs).

* cited by examiner

METHODS OF CHANGING POLYOLEFIN PRODUCTION RATE WITH THE COMPOSITION OF THE INDUCED CONDENSING AGENTS

This application is a National Stage Application under 35 U.S.C. § 371 of International Application Number PCT/US2015/062465, filed Nov. 24, 2015 and published as WO 2016/086006 on Jun. 2, 2016, which claims the benefit to U.S. Provisional Application 62/084,271, filed Nov. 25, 2014, the entire contents of which are incorporated herein by reference in its entirety.

BACKGROUND

The exemplary embodiments described herein relate to methods for producing polyolefin polymers.

Polyolefin polymers may be produced using gas phase polymerization processes. In a typical gas-phase fluidized bed polymerization process, a gaseous stream containing one or more monomers is continuously passed through the fluidized bed under reactive conditions in the presence of a catalyst. The gaseous stream is withdrawn from the fluidized bed and recycled back into the reactor. Generally, the recycled gas stream is heated in the reactor by the heat of polymerization. This heat may be removed in another part of the cycle (e.g., by a cooling system external to the reactor such as a heat exchanger), so as to maintain the temperature of the resin and gaseous stream inside the reactor below the polymer melting point or the catalyst deactivation temperature.

Heat removal may also help prevent excessive stickiness of polymer particles that may result in agglomeration. Particle agglomerations may lead to the formation of chunks or sheets of polymer that cannot be removed from the reactor as product. Further, such chunks or sheets may fall onto the reactor distributor plate which may impair fluidization of the bed and may lead to a discontinuity event. Additionally, since the polymerization reaction is exothermic, the amount of polymer produced in a fluidized bed polymerization process may be related to the amount of heat that can be withdrawn from the reaction zone.

For a time, it was thought that the temperature of the gaseous stream external to the reactor, otherwise known as the recycle stream temperature, could not be decreased below the dew point of the recycle stream without causing problems such as polymer agglomeration or plugging of the reactor system. The dew point of the recycle stream is the temperature at which liquid condensate first begins to form in the gaseous recycle stream. The dew point can be calculated knowing the gas composition and is thermodynamically defined using an equation of state. However, it was found that in some instances a recycle stream may be cooled to a temperature below the dew point in a fluidized bed polymerization process resulting in condensing a portion of the recycle gas stream outside of the reactor. The resulting stream containing entrained liquid can then be returned to the reactor without causing agglomeration or plugging phenomena. The process of purposefully condensing a portion of the recycle stream is known in the industry as "condensed mode" operation. When a recycle stream temperature is lowered to a point below its dew point in condensed mode operation, an increase in polymer production may be possible.

Cooling of the recycle stream to a temperature below the gas dew point temperature produces a two-phase gas/liquid mixture that may have entrained solids contained in both phases. The liquid phase of this two-phase gas/liquid mixture in condensed mode operation is generally entrained in the gas phase of the mixture. Vaporization of the liquid occurs only when heat is added or pressure is reduced. Generally, the vaporization occurs when the two-phase mixture enters the fluidized bed, with the resin providing the required heat of vaporization. The vaporization thus provides an additional means of extracting heat of reaction from the fluidized bed.

The cooling capacity of the recycle gas may be increased further while at a given reaction temperature and a given temperature of the cooling heat transfer medium. This can be performed by adding non-polymerizing, non-reactive materials to the reactor, which are condensable at the temperatures encountered in the process heat exchanger. Such materials are collectively known as induced condensing agents (ICA). Increasing concentrations of an ICA in the reactor causes corresponding increases in the dew point temperature of the reactor gas, which promotes higher levels of condensing for higher (heat transfer limited) production rates from the reactor. However, attempts to operate polymerization reactors with excessive ICA concentrations have led to the polymer particles suspended in the fluid bed to become cohesive or "sticky" and, in some cases, to solidification of the fluid bed in the form of a large chunk. Therefore, the reactor temperature is reduced below the stickiness temperature, which reduces polyolefin production rate.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
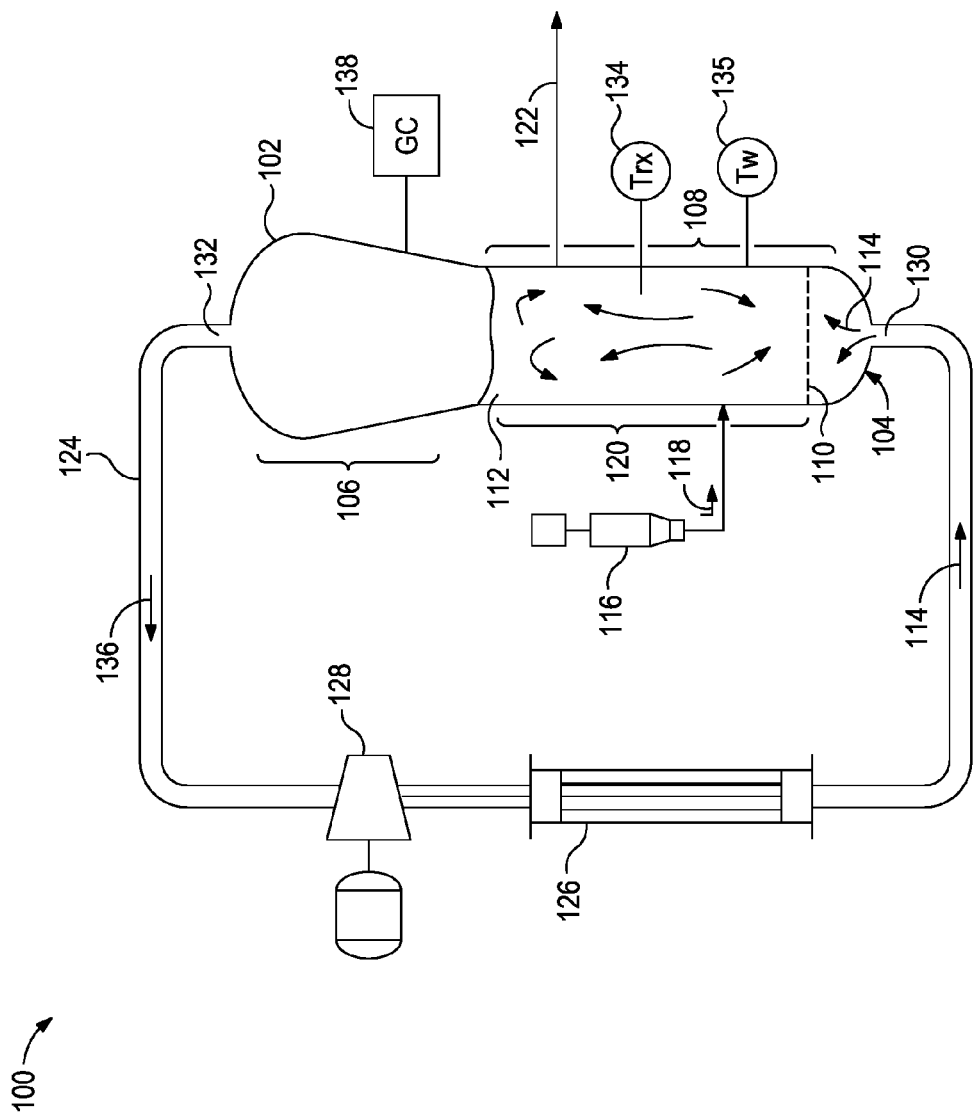
FIG. 1A is a schematic diagram of a polymerization system that can be monitored and controlled in accordance with some of the embodiments described herein.

The exemplary embodiments described herein relate to methods for producing polyolefin polymers where the production rate may be controlled by the composition of the ICA.

The difference between the reactor temperature and the dew point temperature of the recycle stream has been referred to in the art as the "dew point approach temperature." Previously, it was believed that to increase the polyolefin production rate, the dew point approach temperature had to decrease. Surprisingly, the methods described herein increase the polyolefin production rate with increasing dew point approach temperature. The exemplary methods described herein maintain a stickiness temperature during polyolefin polymerization while adjusting the composition of the ICA to achieve a higher ICA dew point (e.g., by increasing the concentration of a lower molecular weight ICA component). The ICA composition with a higher dew point allows for increasing the concentration of the ICA in the reactor, which increases the polyolefin production rate. This method mitigates the previously observed "sticky" drawbacks of excessive ICA concentrations. Further, the composition of the ICA can be systematically changed according to an ICA equivalency factor to achieve the higher polyolefin production.

As used herein, the term "ICA" refers to the total ICA in the reactor and encompasses compositions with one or more ICA components. As used herein, the term "ICA component" refers to individual components of an ICA. For example, an ICA may include one ICA component or, for example two or more ICA components. ICA components suitable for use include isopentane, n-butane, or a combination thereof. Exemplary ICA components suitable for use in the methods described herein may include, but are not limited to, n-butane, isobutane, n-pentane, isopentane, hexane, isohexane, and other hydrocarbon compounds that are similarly non-reactive in the polymerization process.

With reference to a product being produced by a continuous reaction, the expression "instantaneous" value of a property of the product herein denotes the value of the property of the most recently produced quantity of the product. The most recently produced quantity typically undergoes mixing with previously produced quantities of the product before a mixture of the recently and previously produced product exits the reactor. In contrast, with reference to a product being produced by a continuous reaction, "average" (or "bed average") value (at a time "T") of a property herein denotes the value of the property of the product that exits the reactor at time T.

As used herein, the term "polyethylene" denotes a polymer of ethylene and optionally one or more $C_3$-$C_{18}$ alpha-olefins, while the term "polyolefin" denotes a polymer of one or more $C_2$-$C_{18}$ alpha-olefins.

As used herein, the term "melt index" refers to a measure of the use of flow of the melt of the thermoplastic polymer. Melt index may be measured according to ASTM D1238-13 at any suitable weight and temperature. Generally, the melt index of polyolefins is measured at 2.16 kg at 190° C., 5 kg at 190° C., or 21.6 kg at 190° C.

Reactor

The methods described herein may be used in any number of pilot plant or commercial size reactors including any number of designs. For example, the model can be used in commercial-scale reactions, such as gas-phase fluidized-bed polymerization reactions, that can be monitored and optionally also controlled in accordance with the invention. Some such reactions can occur in a reactor having the geometry of the fluidized bed reactor 102 discussed with respect to FIG. 1A. In other embodiments, a reactor is monitored and optionally also controlled in accordance with the invention while it operates to perform polymerization using any of a variety of different processes (e.g., slurry or gas phase processes).

FIG. 1A is a schematic diagram of a polymerization system 100 that can be monitored and controlled in accordance with embodiments described herein. The polymerization system 100 includes a fluidized bed reactor 102. The fluidized bed reactor 102 has a bottom end 104, a top expanded section 106, a straight section 108, and a distributor plate 110 within the straight section 108. A fluidized bed 112 of granular polymer and catalyst particles is contained within the straight section 108, and may optionally extend slightly into the top expanded section 106. The bed is fluidized by the steady flow of recycle gas 114 through the distributor plate 110. The flow rate of the recycle gas 114 is regulated to circulate the fluidized bed 112, as illustrated in FIG. 1A. In some implementations, a superficial gas velocity of about 1 ft/sec to about 3 ft/sec is used to maintain a fluidized bed 112 in the reactor 102 while operating the reactor 102 at a total pressure of about 300 psi.

The polymerization system 100 has one or more catalyst feeders 116 for controlling the addition of polymerization catalyst 118 to a reaction zone 120 within the fluidized bed 112. Within the reaction zone 120, the catalyst particles react with a primary monomer (e.g., ethylene) and optionally a comonomer and other reaction gases (e.g., hydrogen) to produce the granular polymer particles. As new polymer particles are produced, other polymer particles are continually withdrawn from the fluidized bed 112 through a product discharge system 122. The fluidized bed 112 may be maintained at a constant height by withdrawing a portion of the fluidized bed 112 at a rate equal to the rate of formation of particulate product. The product may be removed continuously or nearly continuously via a series of valves (not shown) into a fixed volume chamber (not shown), which is simultaneously vented back to the reactor. This allows for highly efficient removal of the product, while recycling a large portion of the unreacted gases back to the reactor.

After passing through the product discharge system 122, the polymer granules may be degassed (or "purged") with a flow of inert gas such as nitrogen to remove substantially all of the dissolved hydrocarbon materials. In some instances, the polymer granules may be treated with a small stream of humidified nitrogen to deactivate any trace quantities of residual catalyst.

The polymerization system 100 also has a cooling loop which includes a recycle gas line 124, a cooler 126 (such as a circulating gas cooler), and a compressor 128, coupled with the fluidized bed reactor 102. During operation, the cooled circulating gas from the cooler 126 flows through inlet 130 into the fluidized bed reactor 102, then propagates upward through the fluidized bed 112 and out from the fluidized bed reactor 102 via outlet 132.

The top expanded section 106 is also known as a "velocity reduction zone," and is designed to minimize the quantities of particle entrainment from the fluidized bed. The diameter of the top expanded section 106 generally increases with the distance from straight section 108. The increased diameter causes a reduction in the speed of the recycle gas 114, which allows most of the entrained particles to settle back into the fluidized bed 112, thereby minimizing the quantities of solid particles that are "carried over" from the fluidized bed 112 through the recycle gas line 124. Finer entrained particles and dust may optionally be removed in a cyclone and/or fines filter (not shown). In some instances, a screen (not shown) may be included upstream of the compressor 128 to remove larger material.

To maintain a reactor temperature, the temperature of the recycle gas 114 may be continuously adjusted up or down to accommodate any changes in the rate of heat generation due to the polymerization. One or more temperature sensors 134 may be located in the fluidized bed, and used with a control system and the cooling loop to control the temperature $T_{rx}$ of the fluidized bed 112 near the process set-point. Heated reactor gas 136, which carries heat energy from the fluidized bed reactor 102, is withdrawn from the outlet 132 and is pumped by the compressor 128 to the cooler 126 wherein the temperature of the heated reactor gas 136 is reduced and at least some of the ICA present are condensed to a liquid. The recycle gas 114 from the cooler 126, including any condensed liquids, flows to the reactor inlet 130 to cool the fluidized bed 112. Temperature sensors (not shown) near the inlet and outlet of the cooler 126 may provide feedback to a control system (FIG. 1B) to regulate the amount by which cooler 126 reduces the temperature of the recycle gas 114 entering the fluidized bed reactor 102.

The fluidized bed reactor 102 may also include skin temperature sensors 135, mounted in positions along a wall of the straight section 108 of the fluidized bed reactor 102 so as to protrude into the bed from the reactor wall by a small amount (e.g., about one eighth to one quarter of an inch). The skin temperature sensors 135 may be configured and positioned to sense the temperature $T_w$ of the resin near the wall of the fluidized bed reactor 102 during operation.

The temperature sensors 134 in the fluidized bed 112 can include a resistance temperature sensor positioned and configured to sense bed temperature during reactor operation at a location within the fluidized bed reactor 102 away from the reactor wall. The resistance temperature sensor can be mounted so as to protrude into the bed more deeply than the skin temperature sensors 135 (e.g., about 8 to 18 inches away from the reactor wall).

Other sensors and other apparatuses may be employed to measure other reaction parameters during a polymerization reaction. The reaction parameters may include instantaneous and bed-averaged resin product properties (e.g., melt index and density of the polymer resin product being produced by the polymerization system 100 during a polymerization reaction). Resin product properties are conventionally measured by periodically sampling the resin as it exits the reactor (e.g., about once per hour), and performing the appropriate tests in a quality control laboratory.

Other measured reaction parameters may include reactor gas composition (e.g., concentrations and partial pressures of reactant gases, ICA, inert gases, and isomers of other materials, such as nitrogen, inert hydrocarbon, and the like). The reactor gas composition may be measured with a gas chromatograph ("GC") system 138.

The process control variables may be controlled to obtain the desired productivity for the polymerization system 100 and properties for the resin. For example, the parameters used to control gas phase composition within the fluidized bed reactor 102 can include the concentration and composition of the ICA and comonomer, the partial pressure of monomer, the type and properties of catalysts, and the temperature of the reaction process. For example, it is known that a polymerization reaction during a transition may be controlled by controlling process control variables to ensure that the product (e.g., the granular resin) has properties compliant with an initial specification set at the start of the transition, the product produced during the transition ceases to comply with the initial specification set at a first time, and the product has properties compliant with a final specification set at the end of the transition. In the methods described herein, stickiness of the resin during the reaction may be controlled by a control system adjusting (or regulating) the temperature and the composition and concentration of the ICA used in the reaction.

Figure 1B:
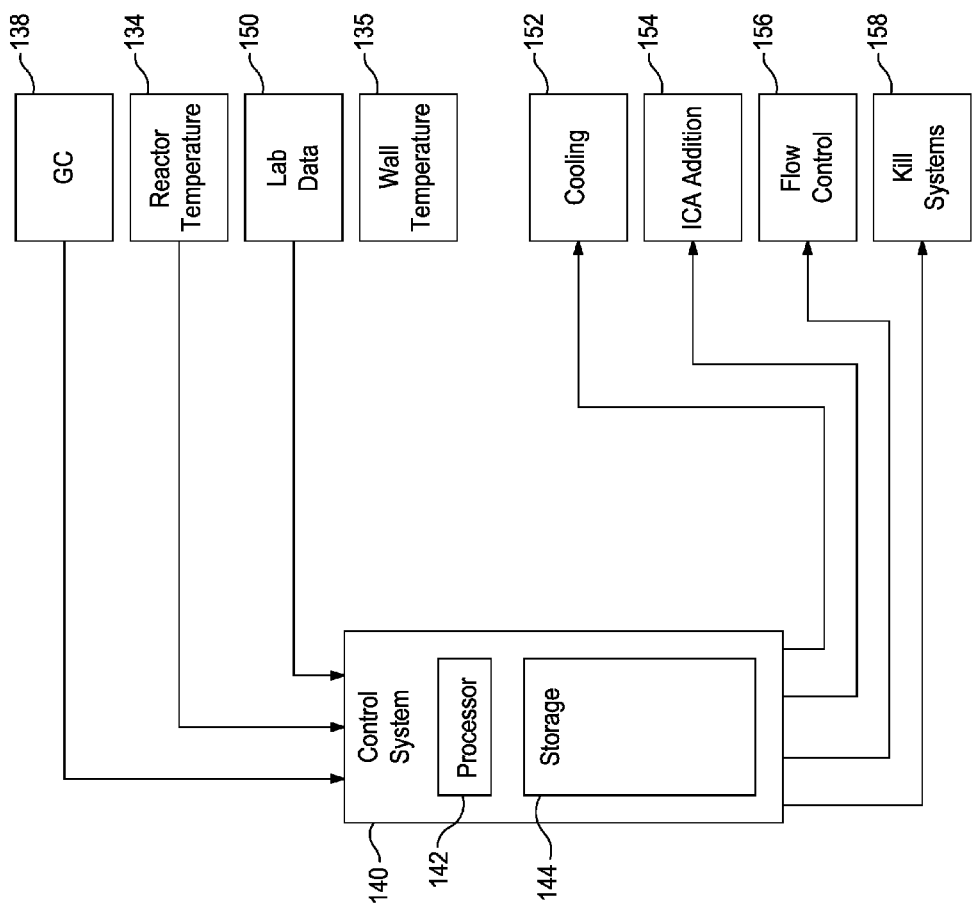
FIG. 1B is a block diagram of a control system that can be used to control the polymerization system in accordance with some of the embodiments described herein.

FIG. 1B is a block diagram of a control system 140 that can be used to control the polymerization system 100. The control system 140 may be a distributed control system (DCS), a direct digital controller (DDC), a programmable logic controller (PLC), or any other suitable system or combination of systems. The control system 140 has a processor 142 that implements machine readable instructions from a storage system 144. Illustrative processors may include a single core processor, a multiple core processor, a virtual processor, a virtual processor in a cloud implementation, an application specific integrated circuit (ASIC), or any combination of these systems. Illustrative storage systems 144 can include random access memory (RAM), read only memory (ROM), hard drives, virtual hard drives, RAM drives, cloud storage systems, optical storage systems, physically encoded instructions (for example, in an ASIC), or any combination of these systems.

Adjustments to control settings may be determined based on the output of temperature sensors 134 and 135, the GC 138, and lab data 150, among others. After determining new control settings, the control system 140 may make, or recommend, adjustments, for example, to the process cooling systems 152, the ICA addition and recycling systems 154, flow control systems 156, and kill systems 158, among others.

One skilled in the art would readily recognize that the reactor and associated methods may be an element of a staged reactor employing two or more reactors in series, wherein one reactor may produce, for example, a high molecular weight polyolefin and another reactor may produce a low molecular weight polyolefin.

Polyolefin Production Methods

Polyolefin polymerization may be performed by contacting in a reactor (such as the fluidized bed reactor 102 of FIG. 1A) an olefin monomer (sometimes with an optional comonomer) with a catalyst system in the presence of ICA and optionally hydrogen. The individual flow rates of olefin monomer, optional comonomer, optional hydrogen, and ICA (or components thereof) may be controlled to maintain fixed gas composition targets. The concentration of all gases may be measured with a chromatograph. A solid catalyst, a catalyst slurry, or liquid solution of the catalyst may be injected directly into the reactor using a carrier gas (e.g., purified nitrogen), where the feed rate of catalyst may be adjusted to change or maintain the catalyst inventory in the reactor.

In some embodiments, the polymerization reaction may be performed at a reactor pressure of up to about 600 psi (4138 kPa), about 100 psi (690 kPa) to about 600 psi (4138 kPa), about 200 psi (1379 kPa) to about 400 psi (2759 kPa), or about 250 psi (1724 kPa) to about 350 psi (2414 kPa).

The methods described herein allow reactor production rates to be increased (e.g., by changing the ICA composition and increasing the dew point approach temperature), while avoiding the conditions in the reactor that may lead to excessive stickiness or the formation of liquids in the reactor. These methods use available processes and may be implemented at plant sites either on-line, in process control systems, or off-line (e.g., using spreadsheets, databases, or application specific programs).

As described above, increasing productivity of the polymerization process may be achieved by controlling the relative concentrations of two or more ICA components in the reactor (i.e., a mole percent of ICA relative to total reactor gas, which may be derived from the partial pressure of each relative to the total pressure in the reactor). The concentrations of the two or more ICA components may be altered according to an ICA equivalency factor. As used herein, the term "ICA equivalency factor" refers to a mole to mole relationship between a first ICA component and a second ICA component where one mole of the second ICA component may be substituted by X moles of the first ICA component. For example, in some embodiments, n-butane and isopentane may have an ICA equivalency factor of about 1.5 to about 3.5, which means that during polyolefin production 1 mole of isopentane can be replaced with about 1.5 moles to about 3.5 moles of n-butane while maintaining the same stickiness temperature and increasing production rate.

The ICA equivalency factor may be used to increase the dew point of the ICA, while maintaining the stickiness temperature of the polyolefin, by increasing the concentration of lower molecular weight ICA component in the system causes the dew point approach temperature to increase, which, in turn, may increase the polyolefin production rate.

Table 1 provides exemplary, non-limiting ICA equivalency factors for various ICA components.

TABLE 1

| ICA | ICA Equivalency Factor Relative to Isopentane |
|---|---|
| n-butane | about 1.5 to about 3.5 |
| isobutane | about 2.0 to about 4.0 |
| n-pentane | about 0.8 to about 1.2 |
| n-hexane | about 0.2 to about 0.4 |
| isohexane | about 0.2 to about 0.6 |

In some instances, the equivalency factor may be related to the ratio of the ICA vapor pressure relative to the isopentane vapor pressure.

The concentration of the ICA in the reactor (i.e., the mole percent of ICA in the reactor or the sum of mole percent of each of the ICA components as a function of total reactor gas) may change as the composition of the ICA changes. For example, using an ICA equivalency factor of 2 for n-butane: isopentane, the partial pressure of the ICA in the reactor may increase as isopentane is replaced with n-butane to achieve a greater dew point approach temperature and higher polyolefin production rate. Using the same ICA equivalency factor, in some instances, the reactor may have a maximum polyolefin production rate, which, if exceeded, may be reduced by replacing n-butane with isopentane, which would decrease the partial pressure of ICA in the reactor.

In some embodiments, the partial pressure of ICA in the reactor may be up to about 200 psi (1379 kPa), about 5 psi (34 kPa) to about 150 psi (1034 kPa), or about 20 psi (138 kPa) about 100 psi (689 kPa).

In some embodiments, the mole percent of an individual ICA component relative to total reactor gas may be up to about 50 mol %, about 1 mol % to about 40 mol %, about 5 mol % to about 30 mol %, or about 10 mol % to about 20 mol %.

Generally, the olefin monomer concentration is controlled and monitored by the olefin monomer partial pressure. In some embodiments, the olefin partial pressure may be at up to about 600 psi (4138 kPa), about 100 psi (690 kPa) to about 600 psi (4138 kPa), about 100 psi (1379 kPa) to about 400 psi (2759 kPa), or about 150 psi (1724 kPa) to about 250 psi (2414 kPa).

The comonomer concentration may be controlled and monitored by a comonomer to olefin monomer mole ratio (or alternatively, the flow rates of comonomer and olefin monomer are held at a fixed ratio). When present, the comonomer may be at any relative concentration to the olefin monomer that will achieve the desired weight percent incorporation of the comonomer into the finished polyolefin. In some embodiments, the comonomer may be present with the olefin monomer in a mole ratio range in the gas phase of from about 0.0001 to about 50 (comonomer to olefin monomer), from about 0.0001 to about 5 in another embodiment, from about 0.0005 to about 1.0 in yet another embodiment, and from about 0.001 to about 0.5 in yet another embodiment.

The olefin monomer or comonomers, for example, may contain from 2 to 18 carbon atoms in some embodiments. In another embodiment, the olefin monomer may be ethylene, and a comonomer may comprise from 3 to 12 carbon atoms. In yet another embodiment, the olefin monomer may be ethylene or propylene, and a comonomer may comprise from 4 to 10 carbon atoms. In another embodiment, the olefin monomer may be ethylene or propylene, and a comonomer may comprise from 4 to 8 carbon atoms. Exemplary alpha-olefins that may be utilized as a comonomer in embodiments describe herein may include, but are not limited to, ethylene, propylene, 1-butene, 1-pentene, 1-hexene, 1-heptene, 1-octene, 4-methylpent-1-ene, 1-decene, 1-dodecene, 1-hexadecene, and the like, and any combination thereof. Additionally, a polyene may be used as a comonomer according to some embodiments described herein. Exemplary polyenes may include, but are not limited to, such as 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, and olefins formed in situ in the polymerization medium. When olefins are formed in situ in the polymerization medium, the formation of polyolefins containing long chain branching may occur. Additional examples of comonomers may include isoprene, styrene, butadiene, isobutylene, chloroprene, acrylonitrile, and cyclic olefins. Combinations of the foregoing may be utilized in the methods described herein.

Examples of polymers that can be produced in accordance with the method described herein may include the following: homopolymers and copolymers of $C_2$-$C_{18}$ alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; polychloroprene; norbornene homopolymers and copolymers with one or more $C_2$-$C_{18}$ alpha olefin; and terpolymers of one or more $C_2$-$C_{18}$ alpha olefins with a diene. In some embodiments, the polyolefin produced by the method described herein may include olefin homopolymers (e.g., homopolymers of ethylene or propylene). In some instances, the polyolefin produced may be copolymers, terpolymers, and the like of the olefin monomer and the comonomer. In some embodiments, the polyolefin produced may be a polyethylene or a polypropylene. Exemplary polyethylenes produced by the methods described herein may be homopolymers of ethylene or interpolymers of ethylene and at least one alpha-olefin (comonomer) wherein the ethylene content may be at least about 50% by weight of the total monomers involved. Exemplary polypropylenes produced by the methods described herein may be homopolymers of propylene or interpolymers of propylene and at least one alpha-olefin (comonomer) wherein the propylene content may be at least about 50% by weight of the total monomers involved.

Hydrogen gas is often used in olefin polymerization to control the final properties of the polyolefin. For some types of catalyst systems, increasing concentrations (or partial pressures) of hydrogen may alter the molecular weight or melt index of the polyolefin generated. The melt index can thus be influenced by the hydrogen concentration. Generally, the amount of hydrogen in the polymerization is expressed as a mole ratio relative to the total polymerizable monomer (e.g., relative to ethylene or relative to a blend of ethylene and hexene or propylene). The amount of hydrogen used in some polymerization processes is an amount necessary to achieve the desired melt index (or molecular weight) of the final polyolefin resin. In some embodiments, the mole ratio in the gas phase of hydrogen to total polymerizable monomer ($H_2$ to monomer) may be greater than about 0.00001, greater than about 0.0005, greater than about 0.001, less than about 10, less than about 5, less than about 3, or less than about 0.10, wherein a desirable range may comprise any combination of any upper mole ratio limit with any lower mole ratio limit described herein. Expressed another way, the amount of hydrogen in the reactor at any time may range to up to about 10 ppm in some embodiments, up to about 100 or about 3000 or about 4000 or about 5000 ppm in other embodiments, between about 10 ppm and about 5000 ppm in yet another embodiment, or between about 500 ppm and about 2000 ppm in another embodiment.

Exemplary catalysts suitable for use in the embodiments described herein may include, but are not limited to, Ziegler Natta catalysts, chromium based catalysts, vanadium base catalysts (e.g., vanadium oxychloride and vanadium acetylacetonate), metallocene catalysts and other single-site or single-site-like catalysts, cationic forms of metal halides (e.g., aluminum trihalides), anionic initiators (e.g., butyl lithiums), cobalt catalysts and mixtures thereof, Nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium. A single catalyst may be used, or a mixture of catalysts may be employed, if desired. The catalyst may be soluble or insoluble, supported or unsupported. Further, the catalyst may be a prepolymer, spray dried with or without a filler, a liquid, or a solution, slurry/suspension, or dispersion.

Metallocenes as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving groups bound to the at least one metal atom. As used herein, these compounds may be referred to as "metallocenes" or "metallocene catalyst components." The metallocene catalyst component may be supported on a support material, and may be supported with or without another catalyst component. In some embodiments, the one or more metallocene catalyst components are represented by the formula (I):

$$Cp^A Cp^B MX_n \qquad (I)$$

wherein M is a metal atom selected from the group consisting of Groups 3 through 12 atoms and lanthanide Group atoms in some embodiments. For example, M may be selected from Ti, Zr, Hf atoms. Each leaving group X is chemically bonded to M; each Cp group is chemically bonded to M; and n is 0 or an integer from 1 to 4, and may be either 1 or 2 in a particular embodiment.

The Cp ligands may be one or more rings or ring systems, at least a portion of which includes Π-bonded systems, such as cycloalkadienyl ligands and heterocyclic analogues. The Cp ligands are distinct from the leaving groups bound to the catalyst compound in that they are not highly susceptible to substitution or abstraction reactions. The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by at least one R group. Non-limiting examples of substituent R groups include groups selected from hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, $Cp^A$ and $Cp^B$ are independently selected from the group consisting of cyclopentadienyl, indenyl, tetrahydroindenyl, fluorenyl, and substituted derivatives of each. As used herein, the term "substituted" means that the group following that term possesses at least one moiety in place of one or more hydrogens in any position, which moieties are selected from such groups as halogen radicals (e.g., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls may include, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

In some embodiments, each leaving group X in the formula (I) above may be independently selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons, and substituted derivatives thereof. As used herein, the phrase "leaving group" refers to one or more chemical moieties bound to the metal center of the catalyst component, which can be abstracted from the catalyst component by an activator, thus producing a species active towards olefin polymerization or oligomerization.

The structure of the metallocene catalyst component may take on many forms, such as those disclosed in, for example, U.S. Pat. Nos. 5,026,798, 5,703,187, and 5,747,406, including a dimer or oligomeric structure, such as disclosed in, for example, U.S. Pat. Nos. 5,026,798 and 6,069,213. Others include those catalysts described in U.S. Patent Application Publication Nos. US2005/0124487A1, US2005/0164875A1, and US2005/0148744. In some embodiments, the metallocene may be formed with a hafnium metal atom (e.g., bis(n-propylcyclopentadienyl) hafnium $X_n$, bis(n-butylcyclopentadienyl) hafnium Xn, or bis(n-pentylcyclopentadienyl) hafnium $X_n$, where X is one of chloride or fluoride and n is 2), such as is described in U.S. Pat. Nos. 6,242,545 and 7,157,531.

In certain embodiments, the metallocene catalysts components described above may include their structural or optical or enantiomeric isomers (racemic mixture), and, in some embodiments, may be a pure enantiomer.

In some embodiments, the catalyst may be a metallocene catalyst in the absence of, or essentially free of, any scavengers (e.g., triethylaluminum, trimethylaluminum, triisobutylaluminum, tri-n-hexylaluminum, diethyl aluminum chloride, dibutyl zinc and the like). By "essentially free," it is meant that these compounds are not deliberately added to the reactor or any reactor components, and if present, are present in less than about 1 ppm in the reactor.

In some embodiments, the catalysts may be used with cocatalysts and promoters (e.g., alkylaluminums, alkylaluminum halides, alkylaluminum hydrides, and aluminoxanes).

In some instances, the one or more catalysts may be combined with up to about 10 wt % of one or more antistatic agents as are known in the art, such as a metal-fatty acid compound (e.g., an aluminum stearate), based upon the weight of the catalyst system (or its components). Other metals that may be suitable include other Group 2 and Group 5-13 metals. One or more antistatic agents may be added directly to the reactor system as well.

In some instances, supported catalyst(s) may be combined with activators by tumbling and/or other suitable means, optionally with up to about 2.5 wt % (by weight of the catalyst composition) of an antistatic agent. Exemplary antistatic agent may include, but are not limited to, an ethoxylated or methoxylated amine (e.g., KEMAMINE AS-990, available from ICI Specialties) and polysulfone copolymers in the OCTASTAT family of compounds, more specifically Octastat 2000, 3000, and 5000 (available from Octel).

In some embodiments, the antistatic agent may be mixed with the catalyst and fed into the reactor. In other embodiments, the antistatic agent may be fed into the reactor separate from the catalyst. One advantage of this method of addition is that it permits on-line adjustment of the level of the additive. The antistatic agents may individually be in a solution, slurry, or as a solid (preferably as a powder) before introduction into the reactor.

In various embodiments, a polymerization reaction according to the methods described herein may optionally employ other additives, such as inert particulate particles.

In some embodiments, the polymerization reaction temperature may be about 30° C. to about 120° C., about 60° C. to about 115° C., about 70° C. to about 110° C., or about 70° C. to about 105° C.

Embodiments disclosed herein include Embodiment A, Embodiment B, and Embodiment C.

Embodiment A

A method that includes contacting in a fluidized bed gas phase reactor an olefin monomer with a catalyst system in the presence of an induced condensing agent (ICA) and optionally hydrogen to produce a polyolefin having a sticking temperature, wherein the ICA comprises a first ICA component and a second ICA component; operating the fluidized bed gas phase reactor at an operating temperature lower than the sticking temperature of the polyolefin; withdrawing a gas phase composition comprising at least some of the olefin, at least some of the ICA, and optionally at least some hydrogen; condensing a portion of the ICA from the gas phase composition yielding a condensed ICA; recycling at least a portion of the condensed ICA and at least a portion of the gas phase composition to the fluidized bed gas phase reactor; and changing a mole percent of total reactor gas for each of the first and the second ICA components according to a first ICA to second ICA equivalency factor so as to cause a dew point approach temperature of the ICA to increase, wherein the dew point approach temperature is an operating temperature of the reactor minus a dew point of the condensedrecycle stream.

Embodiment B

A method that includes contacting in a fluidized bed gas phase reactor an olefin monomer with a catalyst system in the presence of an induced condensing agent (ICA) and optionally hydrogen to produce a polyolefin having a sticking temperature, wherein the ICA comprises a first ICA component and a second ICA component; operating the fluidized bed gas phase reactor at an operating temperature lower than the sticking temperature of the polyolefin; withdrawing a gas phase composition comprising at least some of the olefin, at least some of the ICA, and optionally at least some hydrogen; condensing a portion of the ICA from the gas phase composition yielding a condensed ICA; recycling at least a portion of the condensed ICA and at least a portion of the gas phase composition to the fluidized bed gas phase reactor; and changing a mole percent of total reactor gas for each of the first and the second ICA components according to a first ICA component to second ICA component. equivalency factor while maintaining the sticking temperature of the polyolefin Embodiment C A method that includes contacting in a fluidized bed gas phase reactor an olefin monomer with a catalyst system in the presence of an induced condensing agent (ICA) and optionally hydrogen to produce a polyolefin having a sticking temperature, wherein the ICA comprises a first ICA component and a second ICA component; operating the fluidized bed gas phase reactor at an operating temperature lower than the sticking temperature of the polyolefin; withdrawing a gas phase composition comprising at least some of the olefin, at least some of the ICA, and optionally at least some of the hydrogen; condensing a portion of the ICA from the gas phase composition yielding a condensed ICA; recycling at least a portion of the condensed ICA and at least a portion of the gas phase composition to the fluidized bed gas phase reactor; and increasing a polyolefin production rate by changing a mole percent of total reactor gas for each of the first and the second ICA components according to a first ICA component to second ICA component equivalency factor while maintaining the sticking temperature, thereby increasing a dew point approach temperature of the ICA, wherein the dew point approach temperature is an operating temperature of the reactor minus a dew point of the condensed recycle stream.

Each of embodiments A, B, and C may have one or more of the following additional elements in any combination: Element 1: the method further including contacting in the fluidized bed gas phase reactor the olefin monomer and at least one comonomer with the catalyst system in the presence of the ICA and optionally hydrogen to produce the polyolefin; Element 2: wherein the olefin monomer is ethylene and the at least one comonomer is selected from the group consisting of propylene, 1-butene, 1-pentene, 1-hexene, 1-heptene, 1-octene, 4-methylpent-1-ene, 1-decene, 1-dodecene, 1-hexadecene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, isoprene, styrene, butadiene, isobutylene, chloroprene, acrylonitrile, and a cyclic olefin; Element 3: wherein the first ICA is n-butane, the second ICA is isopentane, and the first ICA to second ICA equivalency factor is about 1.5 to about 3.5; Element 4: wherein the first ICA is n-pentane, the second ICA is isopentane, and the first ICA to second ICA equivalency factor is about 0.8 to about 1.2; and Element 5:

wherein the first ICA is hexane, the second ICA is isopentane, and the first ICA to second ICA equivalency factor is about 0.2 to about 0.4.

By way of non-limiting example, exemplary combinations applicable to A, B, and C include: Element 3 in combination with Element 1 and optionally Element 2; Element 4 in combination with Element 1 and optionally Element 2; and Element 5 in combination with Element 1 and optionally Element 2.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Polyethylene was produced in a fluidized bed reactor similar to that of FIG. 1A using a hafnium-based metallocene catalyst (X-CAT™ VP100 Catalyst, available from Univation Technologies). The produced polyethylene had a density of 0.9106, melt index of 0.62 (measured at 2.16 kg at 190° C. according to ASTM D1238-13), and a melt index ratio of 26.9 (melt index 2.16 kg at 190° C. divided by melt index at 21.6 kg at 190° C., each according to ASTM D1238-13). The polyethylene was produced with an ICA of isopentane. The polyethylene was degassed to remove traces of residual hydrocarbons before use in the experiments detailed below.

Sticking temperatures may be measured as disclosed in WO 2014/039522, which is incorporated herein by reference. As an example, sticking temperatures were determined herein by subjecting the produced polyethylene to various concentrations of gaseous isopentane and n-butane. To measure sticking temperature, the polyethylene was first sieved through a 12 mesh filter. Then, 300 g of the polyethylene was added to an air-driven laboratory autoclave. The reactor was evacuated, and the ICA components were added to the desired concentration relative to total reactor gas. A constant nitrogen partial pressure of 30 psi was applied for constant torque of the agitator. The reactor temperature was then increased slowly until the agitator speed dropped to zero indicating that the sticking temperature was reached.

Figure 2:
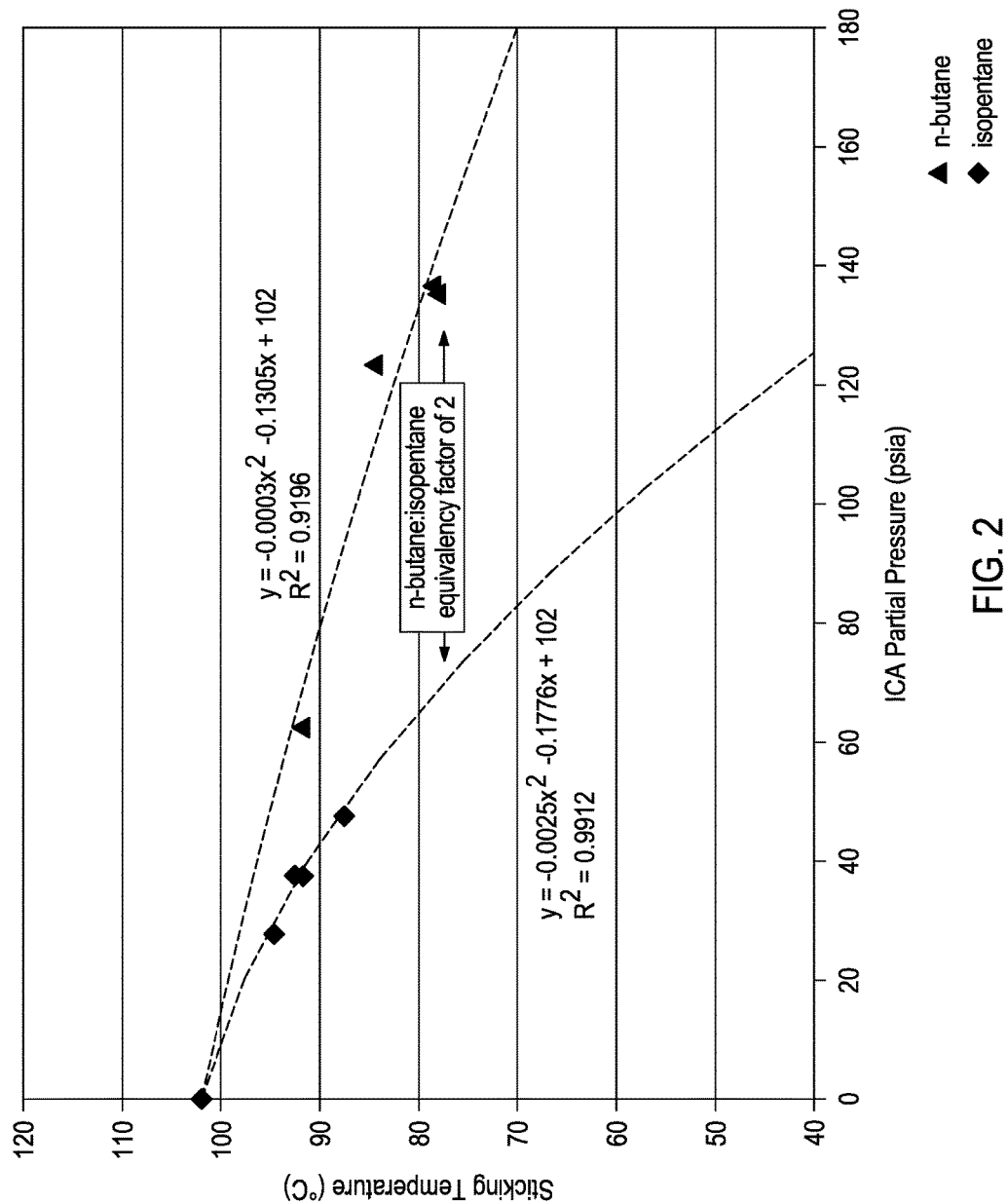
FIG. 2 is a plot of the sticking temperature of the polyethylene as a function of the ICA partial pressure when the ICA is either n-butane or isopentane.

FIG. 2 is a plot of the determined sticking temperatures of the polyethylene as a function of the ICA partial pressure, which illustrates that for the same sticking temperature a higher partial pressure of n-butane may be used as compared to isopentane. Specifically, for this example, FIG. 2 shows that the equivalency factor for n-butane to isopentane could range from about 1.5 to about 3.5, or even be more or less, depending on the particular sticking temperature and ICA partial pressure.

Figure 3:
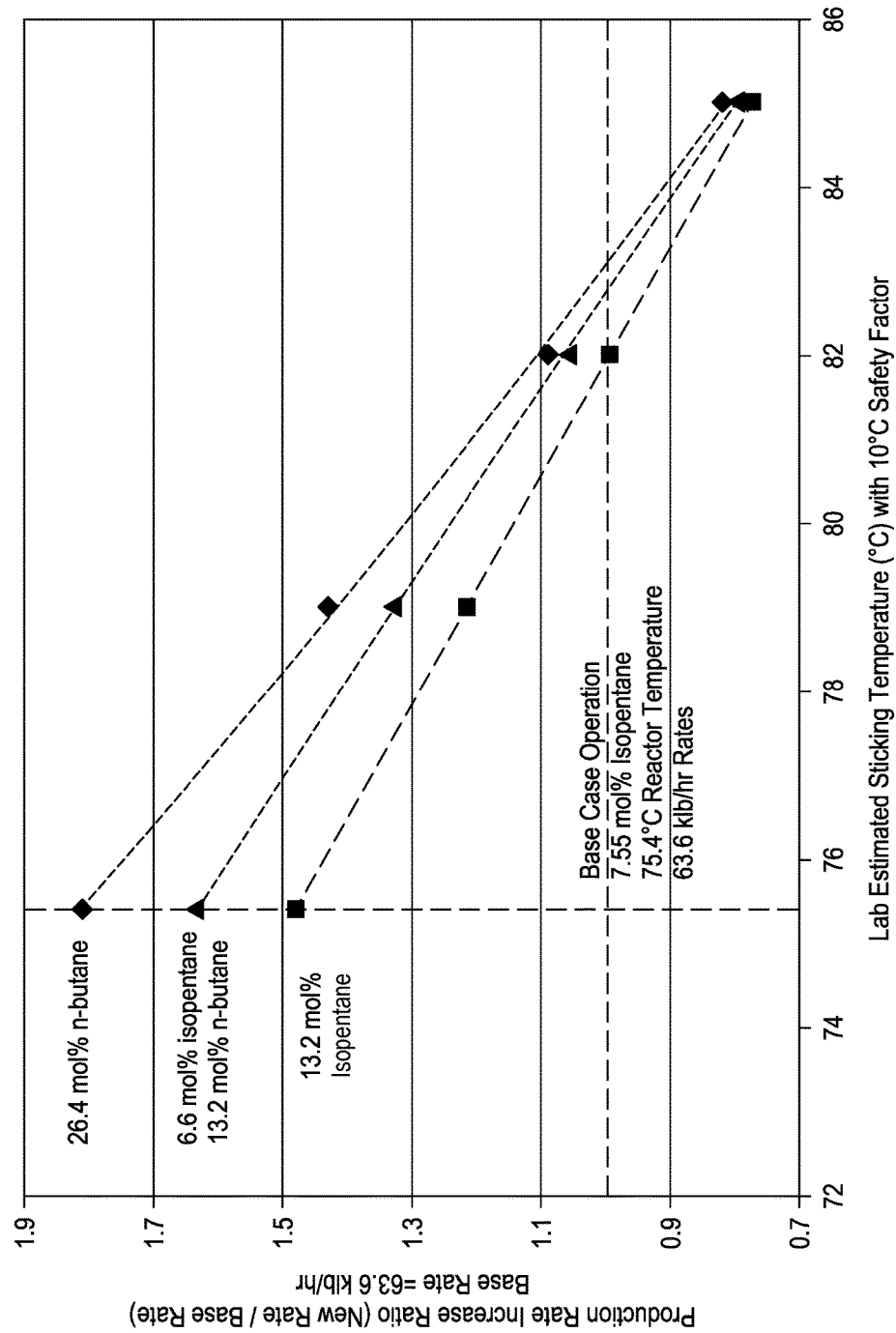
FIG. 3 illustrates the relationship between production rate and sticking temperature, as calculated using an n-butane:isopentane equivalency factor of 2.

Using an n-butane:isopentane equivalency factor of 2, the polyethylene production rate can be estimated at various ICA compositions with corresponding estimated sticking temperatures. FIG. 3 illustrates the relationship between production rate and sticking temperature as calculated using an equivalency factor of 2. Specifically, production rate is reported as a ratio of the calculated production rate to a base case production rate (the base case being 7.55 mol isopentane and 75.4° C. reactor temperature, which produces polyethylene at 63.6 klb/hr). The sticking temperature reported in FIG. 3 incorporates a 10° C. safety factor, meaning the Lab Estimated Sticking Temperature on the X axis of FIG. 3 is the actual stickiness temperature, determined using the procedure above, minus 10° C. This plot illustrates that at the same sticking temperature, higher production rates can be achieved by substituting isopentane with n-butane.

Figure 4:
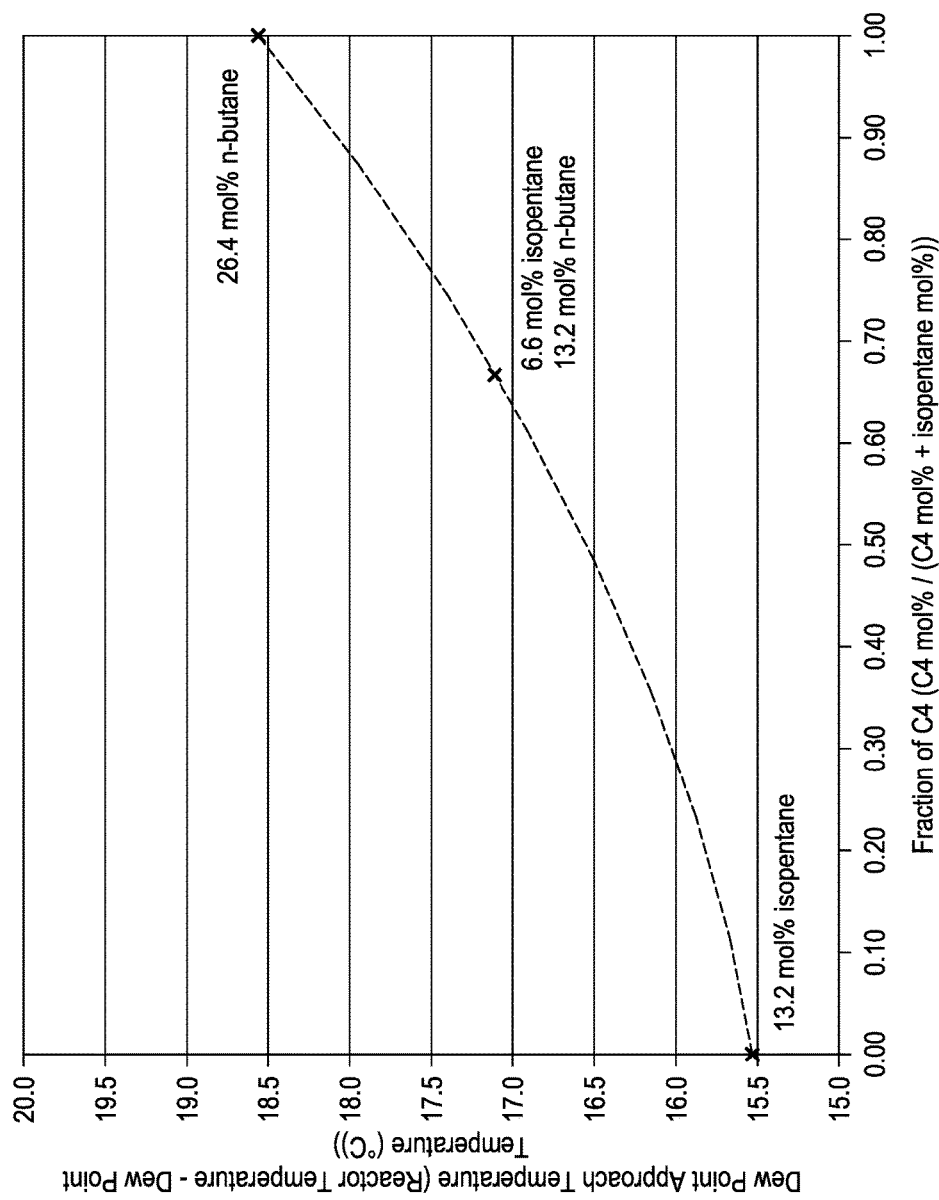
FIG. 4 is a plot of the dew point approach temperature for the data in FIG. 3 as a function of n-butane fraction (mol % n-butane/(mol % n-butane+mol % isopentane) at a constant sticking temperature.

FIG. 4 is a plot of the dew point approach temperature for the data in FIG. 3 as a function of n-butane fraction (mol % n-butane/(mol % n-butane+mol % isopentane) at a constant sticking temperature. This plot in conjunction with FIG. 3 illustrates that production rates increase with increasing fraction of n-butane and while increasing the dew point approach temperature.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
contacting in a fluidized bed gas phase reactor an olefin monomer with a catalyst system in the presence of an induced condensing agent (ICA) and optionally hydrogen to produce a polyolefin having a sticking temperature, wherein the ICA comprises a first ICA component and a second ICA component;
operating the fluidized bed gas phase reactor at an operating temperature lower than the sticking temperature of the polyolefin;
withdrawing a gas phase composition comprising at least some of the olefin, at least some of the ICA, and optionally at least some hydrogen;
condensing a portion of the ICA from the gas phase composition yielding a condensed ICA;
recycling at least a portion of the condensed ICA and at least a portion of the gas phase composition to the fluidized bed gas phase reactor; and
changing a mole percent of total reactor gas for each of the first and the second ICA components according to a first ICA to second ICA equivalency factor whereby one mole of the second ICA component is substituted with a predetermined number of moles of the first ICA component so as to cause a dew point approach temperature of the ICA to increase, wherein the dew point approach temperature is an operating temperature of the reactor minus a dew point of the condensed recycle stream.

2. The method of claim 1 further comprising:
contacting in the fluidized bed gas phase reactor the olefin monomer and at least one comonomer with the catalyst system in the presence of the ICA and optionally hydrogen to produce the polyolefin.

3. The method of claim 2, wherein the olefin monomer is ethylene and the at least one comonomer is selected from the group consisting of propylene, 1-butene, 1-pentene, 1-hexene, 1-heptene, 1-octene, 4-methylpent-1-ene, 1-decene, 1-dodecene, 1-hexadecene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, isoprene, styrene, butadiene, isobutylene, chloroprene, acrylonitrile, and a cyclic olefin.

4. The method of claim 1, wherein the first ICA is n-butane, the second ICA is isopentane, and the first ICA to second ICA equivalency factor is about 1.5 to about 3.5.

5. The method of claim 1, wherein the first ICA is n-pentane, the second ICA is isopentane, and the first ICA to second ICA equivalency factor is about 0.8 to about 1.2.

6. The method of claim 1, wherein the first ICA is hexane, the second ICA is isopentane, and the first ICA to second ICA equivalency factor is about 0.2 to about 0.4.

7. A method comprising:
contacting in a fluidized bed gas phase reactor an olefin monomer with a catalyst system in the presence of an induced condensing agent (ICA) and optionally hydrogen to produce a polyolefin having a sticking temperature, wherein the ICA comprises a first ICA component and a second ICA component;
operating the fluidized bed gas phase reactor at an operating temperature lower than the sticking temperature of the polyolefin;
withdrawing a gas phase composition comprising at least some of the olefin, at least some of the ICA, and optionally at least some hydrogen;
condensing a portion of the ICA from the gas phase composition yielding a condensed ICA;
recycling at least a portion of the condensed ICA and at least a portion of the gas phase composition to the fluidized bed gas phase reactor; and
changing a mole percent of total reactor gas for each of the first and the second ICA components according to a first ICA component to second ICA component equivalency factor whereby one mole of the second ICA component is substituted with a predetermined number of moles of the first ICA component thereby maintaining the sticking temperature of the polyolefin and increasing the dew point approach temperature.

8. The method of claim 7 further comprising:
contacting in the fluidized bed gas phase reactor the olefin monomer and at least one comonomer with the catalyst system in the presence of the ICA and optionally hydrogen to produce the polyolefin.

9. The method of claim 7, wherein the first ICA is n-butane, the second ICA is isopentane, and the first ICA to second ICA equivalency factor is about 1.5 to about 3.5.

10. The method of claim 7, wherein the first ICA is n-pentane, the second ICA is isopentane, and the first ICA to second ICA equivalency factor is about 0.8 to about 1.2.

11. The method of claim 7, wherein the first ICA is hexane, the second ICA is isopentane, and the first ICA to second ICA equivalency factor is about 0.2 to about 0.4.

12. A method comprising:
contacting in a fluidized bed gas phase reactor an olefin monomer with a catalyst system in the presence of an induced condensing agent (ICA) and optionally hydrogen to produce a polyolefin having a sticking temperature, wherein the ICA comprises a first ICA component and a second ICA component;
operating the fluidized bed gas phase reactor at an operating temperature lower than the sticking temperature of the polyolefin;
withdrawing a gas phase composition comprising at least some of the olefin, at least some of the ICA, and optionally at least some hydrogen;
condensing a portion of the ICA from the gas phase composition yielding a condensed ICA;
recycling at least a portion of the condensed ICA and at least a portion of the gas phase composition to the fluidized bed gas phase reactor; and
increasing a polyolefin production rate by changing a mole percent of total reactor gas for each of the first and the second ICA components according to a first ICA component to second ICA component equivalency factor whereby one mole of the second ICA component is substituted with a predetermined number of moles of the first ICA component while maintaining the sticking temperature, thereby increasing a dew point approach temperature of the ICA, wherein the dew point approach temperature is an operating temperature of the reactor minus a dew point of the condensed recycle stream.

13. The method of claim 12 further comprising:
contacting in the fluidized bed gas phase reactor the olefin monomer and at least one comonomer with the catalyst system in the presence of the ICA and optionally hydrogen to produce the polyolefin.

14. The method of claim 12, wherein the first ICA is n-butane, the second ICA is isopentane, and the first ICA to second ICA equivalency factor is about 1.5 to about 3.5.

15. The method of claim 12, wherein the first ICA is n-pentane, the second ICA is isopentane, and the first ICA to second ICA equivalency factor is about 0.8 to about 1.2.

16. The method of claim 12, wherein the first ICA is hexane, the second ICA is isopentane, and the first ICA to second ICA equivalency factor is about 0.2 to about 0.4.

\* \* \* \* \*